US008861400B2

(12) United States Patent
Angst et al.

(10) Patent No.: US 8,861,400 B2
(45) Date of Patent: Oct. 14, 2014

(54) REQUESTING MULTICAST MEMBERSHIP INFORMATION IN A DISTRIBUTED SWITCH IN RESPONSE TO A MISS EVENT

(75) Inventors: Debra L. Angst, Rochester, MN (US); Claude Basso, Nice (FR); Josep Cors, Rochester, MN (US); Todd A. Greenfield, Rochester, MN (US); Natarajan Vaidhyanathan, Carrboro, NC (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 13/352,952

(22) Filed: Jan. 18, 2012

(65) Prior Publication Data
US 2013/0182706 A1 Jul. 18, 2013

(51) Int. Cl.
  *H04L 12/28* (2006.01)
  *H04L 12/18* (2006.01)
  *H04L 12/751* (2013.01)
  *H04L 12/24* (2006.01)
  *H04L 12/721* (2013.01)

(52) U.S. Cl.
  CPC ............... *H04L 12/185* (2013.01); *H04L 45/02* (2013.01); *H04L 41/12* (2013.01); *H04L 45/44* (2013.01)
  USPC ............ 370/254; 370/400; 370/432; 709/242

(58) Field of Classification Search
  None
  See application file for complete search history.

(56) References Cited

U.S. PATENT DOCUMENTS

| 5,572,522 A | 11/1996 | Calamvokis et al. |
| 5,592,476 A | 1/1997 | Calamvokis et al. |

(Continued)

FOREIGN PATENT DOCUMENTS

| CN | 101110730 A | 1/2008 |
| CN | 101442502 A | 5/2009 |

(Continued)

OTHER PUBLICATIONS

Cisco Systems, "Integrating the Cisco Catalyst Blade Switch 3130 for Dell PowerEdge M1000e Blade Enclosure into the Cisco Data Center Network Architecture—Design Guide", Oct. 2007, retrieved from the Internet: http://cisco.com/en/US/prod/collateral/sw, 29 pages.

(Continued)

*Primary Examiner* — Timothy J Weidner
(74) *Attorney, Agent, or Firm* — Toler Law Group

(57) ABSTRACT

Apparatuses and methods to request multicast membership information in a distributed switch are provided. A particular method may include requesting multicast membership information of a group identified by a multicast destination address in a distributed switch. The distributed switch may include a plurality of distributed switch elements with a plurality of switch forwarding units. The method may generate a miss event indicating that the multicast destination address is unregistered in a switch forwarding unit of a distributed switch element and there is a need for the multicast membership information. The method may also request the multicast membership information of the multicast destination address in response to the miss event. The method may further initiate a query for the multicast membership information of the multicast destination address in response to the request.

17 Claims, 5 Drawing Sheets

(56) References Cited

U.S. PATENT DOCUMENTS

| | | | |
|---|---|---|---|
| 5,901,140 A | 5/1999 | Van As et al. | |
| 5,995,511 A | 11/1999 | Zhou et al. | |
| 6,018,526 A | 1/2000 | Liu et al. | |
| 6,370,142 B1* | 4/2002 | Pitcher et al. | 370/390 |
| 6,408,163 B1 | 6/2002 | Fik | |
| 6,421,731 B1 | 7/2002 | Ciotti, Jr. et al. | |
| 6,501,754 B1 | 12/2002 | Ohba et al. | |
| 6,725,281 B1* | 4/2004 | Zintel et al. | 719/318 |
| 6,802,068 B1 | 10/2004 | Guruprasad | |
| 6,804,236 B1* | 10/2004 | Mahajan et al. | 370/390 |
| 6,807,172 B1 | 10/2004 | Levenson et al. | |
| 6,873,603 B1 | 3/2005 | Ivaturi | |
| 6,950,431 B1 | 9/2005 | Nozaki et al. | |
| 6,980,547 B1 | 12/2005 | Gally et al. | |
| 6,993,033 B1 | 1/2006 | Williams | |
| 7,023,857 B1 | 4/2006 | Chiussi et al. | |
| 7,107,360 B1 | 9/2006 | Phadnis et al. | |
| 7,138,733 B2 | 11/2006 | Sanders et al. | |
| 7,167,922 B2 | 1/2007 | Narayanan | |
| 7,233,991 B2 | 6/2007 | Adhikari | |
| 7,272,652 B1 | 9/2007 | Keller-Tuberg | |
| 7,281,039 B1 | 10/2007 | Salkewicz | |
| 7,333,491 B2 | 2/2008 | Chen et al. | |
| 7,751,416 B2 | 7/2010 | Smith et al. | |
| 7,756,027 B1 | 7/2010 | Reddy et al. | |
| 7,831,759 B2 | 11/2010 | Boyd et al. | |
| 7,876,746 B1 | 1/2011 | Pannell et al. | |
| 7,889,728 B2 | 2/2011 | Arad et al. | |
| 7,969,980 B1* | 6/2011 | Florit et al. | 370/390 |
| 7,992,149 B2 | 8/2011 | Carollo et al. | |
| 8,054,832 B1 | 11/2011 | Shukla et al. | |
| 8,085,791 B1 | 12/2011 | Aggarwal et al. | |
| 8,090,805 B1 | 1/2012 | Chawla et al. | |
| 8,102,848 B1 | 1/2012 | Rao | |
| 8,121,126 B1 | 2/2012 | Moisand et al. | |
| 8,190,960 B1 | 5/2012 | Bahadur et al. | |
| 8,194,534 B2 | 6/2012 | Pandey et al. | |
| 8,259,720 B2 | 9/2012 | Farinacci et al. | |
| 8,271,680 B2 | 9/2012 | Salkewicz | |
| 8,345,536 B1 | 1/2013 | Rao et al. | |
| 8,447,909 B2 | 5/2013 | Corrigan et al. | |
| 2001/0043614 A1 | 11/2001 | Viswanadham et al. | |
| 2002/0176370 A1 | 11/2002 | Ohba et al. | |
| 2003/0026268 A1 | 2/2003 | Navas | |
| 2003/0037163 A1 | 2/2003 | Kitada et al. | |
| 2003/0236852 A1 | 12/2003 | Fernandes et al. | |
| 2004/0037279 A1 | 2/2004 | Zelig et al. | |
| 2004/0174898 A1 | 9/2004 | Kadambi et al. | |
| 2004/0179476 A1 | 9/2004 | Kim et al. | |
| 2004/0199698 A1 | 10/2004 | Bolian et al. | |
| 2005/0201406 A1* | 9/2005 | Sekine et al. | 370/432 |
| 2006/0023708 A1 | 2/2006 | Snively et al. | |
| 2006/0149886 A1 | 7/2006 | Chen et al. | |
| 2006/0159092 A1 | 7/2006 | Boers et al. | |
| 2006/0248158 A1 | 11/2006 | Ha et al. | |
| 2006/0251067 A1 | 11/2006 | DeSanti et al. | |
| 2007/0030817 A1* | 2/2007 | Arunachalam et al. | 370/254 |
| 2007/0047536 A1 | 3/2007 | Scherer et al. | |
| 2007/0067432 A1 | 3/2007 | Tarui et al. | |
| 2007/0111414 A1 | 5/2007 | Chaudhry et al. | |
| 2007/0147368 A1 | 6/2007 | Desai et al. | |
| 2007/0184572 A1 | 8/2007 | Kohli et al. | |
| 2007/0260910 A1 | 11/2007 | Jain et al. | |
| 2007/0266179 A1 | 11/2007 | Chavan et al. | |
| 2007/0268830 A1 | 11/2007 | Li et al. | |
| 2007/0299987 A1 | 12/2007 | Parker et al. | |
| 2008/0002579 A1 | 1/2008 | Lindholm et al. | |
| 2008/0056300 A1 | 3/2008 | Williams | |
| 2008/0069100 A1 | 3/2008 | Weyman et al. | |
| 2008/0107109 A1 | 5/2008 | Michaud | |
| 2008/0109565 A1 | 5/2008 | Ajanovic et al. | |
| 2008/0159260 A1 | 7/2008 | Vobbilisetty et al. | |
| 2008/0159277 A1 | 7/2008 | Vobbilisetty et al. | |
| 2008/0219237 A1 | 9/2008 | Thubert et al. | |
| 2008/0275975 A1 | 11/2008 | Pandey et al. | |
| 2009/0037977 A1 | 2/2009 | Gai et al. | |
| 2009/0161674 A1 | 6/2009 | Bou-Diab et al. | |
| 2009/0161692 A1 | 6/2009 | Hirata et al. | |
| 2009/0201928 A1 | 8/2009 | Chen et al. | |
| 2009/0213869 A1 | 8/2009 | Rajendran et al. | |
| 2009/0245791 A1 | 10/2009 | Thaler et al. | |
| 2009/0252181 A1 | 10/2009 | Desanti | |
| 2009/0254677 A1 | 10/2009 | Desanti | |
| 2009/0265501 A1 | 10/2009 | Uehara et al. | |
| 2009/0276526 A1 | 11/2009 | Carlson et al. | |
| 2009/0323518 A1 | 12/2009 | Rose et al. | |
| 2010/0036995 A1 | 2/2010 | Nakayama et al. | |
| 2010/0054246 A1* | 3/2010 | Shah et al. | 370/390 |
| 2010/0067374 A1 | 3/2010 | Elangovan et al. | |
| 2010/0067910 A1 | 3/2010 | Mizutani et al. | |
| 2010/0074175 A1 | 3/2010 | Banks et al. | |
| 2010/0085966 A1 | 4/2010 | Samuels et al. | |
| 2010/0107162 A1 | 4/2010 | Edwards et al. | |
| 2010/0128605 A1 | 5/2010 | Chavan et al. | |
| 2010/0150174 A1 | 6/2010 | Bhide et al. | |
| 2010/0257263 A1 | 10/2010 | Casado et al. | |
| 2010/0257269 A1 | 10/2010 | Clark | |
| 2010/0325257 A1 | 12/2010 | Goel et al. | |
| 2011/0038292 A1 | 2/2011 | Salomone et al. | |
| 2011/0055433 A1 | 3/2011 | Kishore et al. | |
| 2011/0061094 A1 | 3/2011 | Salkewicz | |
| 2011/0069710 A1 | 3/2011 | Naven et al. | |
| 2011/0085546 A1 | 4/2011 | Capello et al. | |
| 2011/0085557 A1 | 4/2011 | Gnanasekaran et al. | |
| 2011/0103391 A1 | 5/2011 | Davis et al. | |
| 2011/0134915 A1 | 6/2011 | Srinivasan | |
| 2011/0153715 A1 | 6/2011 | Oshins et al. | |
| 2011/0213868 A1 | 9/2011 | Chen et al. | |
| 2011/0219208 A1* | 9/2011 | Asaad et al. | 712/12 |
| 2011/0243134 A1 | 10/2011 | Armstrong et al. | |
| 2011/0243146 A1 | 10/2011 | Armstrong et al. | |
| 2011/0258340 A1 | 10/2011 | Armstrong et al. | |
| 2011/0258641 A1 | 10/2011 | Armstrong et al. | |
| 2011/0261687 A1 | 10/2011 | Armstrong et al. | |
| 2011/0261815 A1* | 10/2011 | Armstrong et al. | 370/390 |
| 2011/0261826 A1 | 10/2011 | Armstrong et al. | |
| 2011/0261827 A1 | 10/2011 | Armstrong et al. | |
| 2011/0262134 A1 | 10/2011 | Armstrong et al. | |
| 2011/0264610 A1 | 10/2011 | Armstrong et al. | |
| 2011/0320671 A1 | 12/2011 | Armstrong et al. | |
| 2012/0027014 A1 | 2/2012 | Mack-Crane et al. | |
| 2012/0036236 A1 | 2/2012 | Richardson et al. | |
| 2012/0039235 A1 | 2/2012 | Chen et al. | |
| 2012/0113987 A1 | 5/2012 | Riddoch et al. | |
| 2012/0147743 A1 | 6/2012 | Singh et al. | |
| 2012/0209940 A1 | 8/2012 | Kidambi et al. | |
| 2012/0236858 A1 | 9/2012 | Armstrong et al. | |
| 2013/0117469 A1 | 5/2013 | Corrigan et al. | |
| 2013/0156031 A1 | 6/2013 | Mitsumori | |
| 2013/0182707 A1 | 7/2013 | Angst et al. | |

FOREIGN PATENT DOCUMENTS

| | | |
|---|---|---|
| WO | 2006093929 A2 | 9/2006 |
| WO | 2009085536 A2 | 7/2009 |
| WO | 2010024993 A1 | 3/2010 |

OTHER PUBLICATIONS

Cisco Systems, "The Adaptive Architecture for the Data Center Network", Aug. 2007, 3 pages.
Hufferd, J.L., Proxy Based Shortcut; Direct FCoE Data Transfer End to End, Hufferd Enterprises, Oct. 7, 2009, 21 pages.
U.S. Appl. No. 12/765,109; Non-Final Office Action dated Mar. 9, 2012. 12 pages.
U.S. Appl. No. 12/765,109; Non-Final Office Action dated Feb. 8, 2013; 14 pages.
U.S. Appl. No. 12/765,109; Final Office Action dated Jun. 29, 2012; 13 pages.
U.S. Appl. No. 12/765,109; Notice of Allowance dated Jun. 21, 2013; 10 pages.
U.S. Appl. No. 12/765,128; Non-Final Office Action dated Apr. 3, 2012, 10 pages.

(56) References Cited

OTHER PUBLICATIONS

U.S. Appl. No. 12/765,128; Final Office Action dated Aug. 1, 2012; 12 pages.
U.S. Appl. No. 12/765,128; Notice of Allowance dated May 13, 2013; 6 pages.
U.S. Appl. No. 12/765,128; Notice of Allowance dated Jul. 30, 2013; 5 pages.
U.S. Appl. No. 12/763,306; Non-Final Office Action dated Feb. 27, 2012; 20 pages.
U.S. Appl. No. 12/763,306; Notice of Allowance dated Aug. 1, 2012; 6 pages.
U.S. Appl. No. 12/763,306; Notice of Allowance dated Nov. 14, 2012; 5 pages.
U.S. Appl. No. 12/763,306; Notice of Allowance dated Mar. 14, 2013; 5 pages.
U.S. Appl. No. 12/763,323; Non-Final Rejection dated Mar. 28, 2012; 11 pages.
U.S. Appl. No. 12/763,323; Notice of Allowance dated Sep. 14, 2012; 7 pages.
U.S. Appl. No. 12/767,174; Non-Final Office Action dated Feb. 23, 2012; 12 pages.
U.S. Appl. No. 12/767,174; Notice of Allowance dated May 30, 2012; 5 pages.
U.S. Appl. No. 12/767,174; Notice of Allowance dated Oct. 5, 2012; 5 pages.
U.S. Appl. No. 12/767,481; Non-Final Office Action dated Feb. 22, 2012; 10 pages.
U.S. Appl. No. 12/767,481; Notice of Allowance dated Jun. 1, 2012; 5 pages
U.S. Appl. No. 12/767,481; Notice of Allowance dated Oct. 11, 2012; 5 pages.
U.S. Appl. No. 13/485,766; Non-Final Office Action dated Dec. 13, 2012; 10 pages.
U.S. Appl. No. 13/485,766; Notice of Allowance dated Jul. 18, 2013; 6 pages.
U.S. Appl. No. 12/751,187; Non-Final Office Action dated May 30, 2012; 15 pages.
U.S. Appl. No. 12/751,187; Notice of Allowance dated Oct. 26, 2012; 7 pages.
U.S. Appl. No. 12/839,099; Non-Final Office Action dated Jul. 9, 2012; 7 pages.
U.S. Appl. No. 12/839,099; Final Office Action dated Oct. 25, 2012; 8 pages.
U.S. Appl. No. 12/839,099; Notice of Allowance dated Jan. 11, 2013; 5 pages.
U.S. Appl. No. 13/725,559, Non-Final Office Action dated Nov. 26, 2013, 11 pages.
U.S. Appl. No. 12/751,249; Non-Final Office Action dated Oct. 12, 2012; 18 pages.
U.S. Appl. No. 12/751,249; Final Office Action dated Apr. 10, 2013; 16 pages.
U.S. Appl. No. 12/751,249; Notice of Allowance dated Jul. 19, 2013; 8 pages.
U.S. Appl. No. 12/767,506; Non-Final Office Action dated Jan. 18, 2013; 7 pages.
U.S. Appl. No. 12/767,506; Notice of Allowance dated Jun. 17, 2013, 10 pages.
U.S. Appl. No. 12/767,543; Non-Final Office Action dated Oct. 22, 2012; 15 pages.
U.S. Appl. No. 12/767,543; Final Office Action dated May 30, 2013; 17 pages.
International Search Report and Written Opinion of the ISA dated May 30, 2013—International Application No. PCT/IB2012/057522.
Great Britain Search Report for Application No. GB1300234.0 dated May 8, 2013, 1 page.
International Preliminary Report on Patentability for International Application No. PCT/EP2011/062086 issued Jan. 22, 2013, 6 pages.
International Search Report for International Application No. PCT/EP2011/062086 mailed Oct. 11, 2011, 4 pages.
U.S. Appl. No. 13/352,973; Non-Final Office Action dated Mar. 20, 2014; 40 pages.
U.S. Appl. No. 13/352,973; Restriction Requirement dated Jan. 29, 2014; 6 pages.

* cited by examiner

REQUESTING MULTICAST MEMBERSHIP INFORMATION IN A DISTRIBUTED SWITCH IN RESPONSE TO A MISS EVENT

I. FIELD OF THE DISCLOSURE

The disclosure relates to computing technologies, and more particularly, to multicasting data in a distributed switch.

II. BACKGROUND

Multicasting generally refers to the delivery of data in a single transmission to multiple hosts. A switch, such as a distributed switch, forwards the multicast data (e.g., a multicast packet) sent to a multicast destination address to the correct hosts using multicast membership information. However, when the distributed switch does not have the multicast membership information for a multicast destination address, the distributed switch generally defaults to broadcasting or flooding the multicast packet to practically all hosts on a network (e.g., all hosts within a broadcast domain).

By flooding, the distributed switch ensures that the hosts of the group identified by the multicast destination address receive the multicast packet. However, flooding may also result in a waste of bandwidth and transmission of the multicast packet to unintended hosts, which may further pose a security risk. Flooding may also result in a waste of resources as each of the unintended hosts receiving the multicast packet may spend resources ultimately determining that it needs to discard the multicast packet, or the multicast packet is received by an unintended host and a security exposure may occur.

III. SUMMARY OF THE DISCLOSURE

In a particular embodiment, a method is disclosed that requests multicast membership information of a group identified by a multicast destination address in a distributed switch. The distributed switch may include a plurality of distributed switch elements with a plurality of switch forwarding units. The method may generate a miss event indicating that the multicast destination address is unregistered in a switch forwarding unit of a distributed switch element and there is a need for the multicast membership information. The method may also request the multicast membership information of the multicast destination address in response to the miss event. The method may further initiate a query for the multicast membership information of the multicast destination address in response to the request.

In another embodiment, an apparatus is disclosed that includes at least one processor and program code configured to be executed by the processor to request multicast membership information of a group identified by a multicast destination address in a distributed switch. The distributed switch may include a plurality of distributed switch elements with a plurality of switch forwarding units. The program code may be configured to be executed by the processor to generate a miss event indicating that the multicast destination address is unregistered in a switch forwarding unit of a distributed switch element and there is a need for the multicast membership information. The program code may also be configured to be executed by the processor to request the multicast membership information of the multicast destination address in response to the miss event. The program code may further be configured to be executed by the processor to initiate a query for the multicast membership information of the multicast destination address in response to the request.

In a particular embodiment, another method is disclosed that requests multicast membership information of a group identified by a multicast destination address in a distributed switch. The distributed switch includes a plurality of distributed switch elements with a plurality of switch forwarding units. The method may initiate a query for the multicast membership information of the multicast destination address in response to a miss event indicating that the multicast destination address is unregistered in a switch forwarding unit of a distributed switch element and there is a need for the multicast membership information. The method may also receive the multicast membership information in response to the query from at least one host. The method may further snoop the multicast membership information received in response to the query. The method may also program the switch forwarding unit with the snooped multicast membership information.

Features that characterize embodiments are set forth in the claims annexed hereto and forming a further part hereof. However, for a better understanding of embodiments, and of the advantages and objectives attained through their use, reference should be made to the Drawings and to the accompanying descriptive matter.

IV. BRIEF DESCRIPTION OF THE DRAWINGS

V. DETAILED DESCRIPTION

Figure 1:
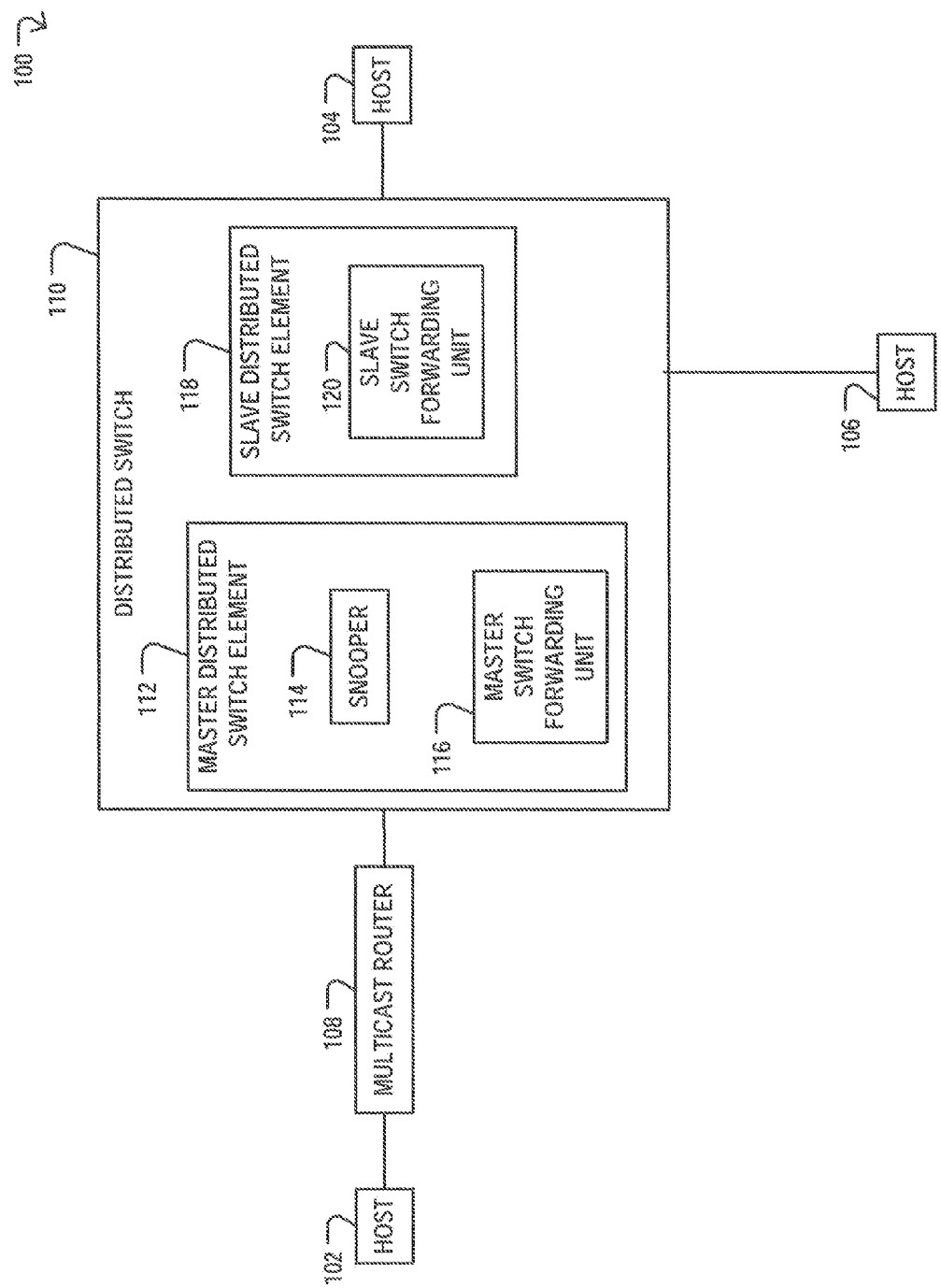
FIG. 1 is a block diagram of an embodiment of a computing system configured to request multicast membership information of a group identified by a multicast destination address in a distributed switch.

Centralized switches typically performed all forwarding functionality for all attached hosts with a single switch forwarding unit, often resulting in bottlenecks and delays. However, many of the challenges of centralized switches have been overcome with the introduction of distributed switches. In particular, distributed switches typically distribute functionality across a multitude of switch forwarding units, with each switch forwarding unit only responsible for forwarding functionality of its attached hosts. The switch forwarding units are also typically only programmed with a multicast destination address and the corresponding multicast membership information when the switch forwarding unit has a "need to know." In particular, switch forwarding units may be programmed when there is a "need to know" because switch forwarding units may have limited capacity in terms of the amount of multicast destination addresses that may be programmed. The limited capacity may result from the use of content addressable memory. Indeed, while the content addressable memory (CAM) contained within each of the switch forwarding units provides a fast search time, CAM's are typically expensive. Nonetheless, for example, when a switch forwarding unit is attached to a host sending multicast data (e.g., multicast packet), the switch forwarding unit has a "need to know" the multicast membership information of the multicast destination address of the multicast data in order to properly forward the multicast data to the members.

Distributed switches may "learn" where to forward multicast data by snooping communications with a snooper. For example, via a communications protocol such as Internet Group Management Protocol (IGMP) or Multicast Listener Discovery (MLD), a router or the distributed switch acts as a querier, and the hosts respond to the queries with reports that are snooped for the multicast membership information. In particular, the reports may be received in response to a general query initiated by the querier at a certain interval. The general query typically solicits every host to report its membership. The reports may also be received in response to a group specific query/multicast address specific query in MLD's case initiated by the querier. The group specific query/multicast address specific query solicits hosts to report membership for that specific group. Moreover, the reports may be received in an unsolicited manner, such as when a host joins a group.

The snooper generally builds a finite-sized global forwarding table of the multicast destination addresses and their corresponding multicast membership information that have been learned. When the table fills up, the snooper typically stops learning until the table has space. As such, the snooper may not learn of a new multicast destination address and its corresponding multicast membership information.

Moreover, the new multicast destination address and its corresponding multicast membership information cannot be programmed into a switch forwarding unit with a "need to know" it, and the switch forwarding unit defaults to flooding the multicast data to practically all hosts on the network (e.g., all hosts within a broadcast domain). The switch forwarding unit also generates a hardware event referred to as a miss event to notify of the "need to know."

Provided herein are embodiments of apparatuses and methods of requesting multicast membership information of a group identified by a multicast destination address in a distributed switch. In particular, the multicast membership information may be requested in response to a miss event generated in the distributed switch, and a query may be initiated in response to the request for the multicast membership information. For example, in response to the miss event, either a master distributed switch element or a slave distributed switch element of the distributed switch may act as a querier and initiate a query (e.g., a general query or a group specific query). By doing so, the distributed switch may have more current multicast destination addresses and corresponding multicast membership information, possibly leading to less flooding.

FIG. 1 illustrates a block diagram of a computing system 100 that may be configured to request multicast membership information of a group identified by a multicast destination address. The multicast membership information may be practically any information related to membership, such as, but not limited to, any hosts or identifiers thereof that have joined the membership of the group identified by the multicast destination address. The multicast membership information may be consistent with communication protocols associated with multicast membership, such as IGMP or MLD. The multicast destination address may be a Media Access Control (MAC) destination address with a bit set to multicast, instead of unicast or broadcast. The multicast destination address identifies a group of hosts or members that have joined the group in order to receive multicast packets sent to that multicast destination address. Each multicast packet may include a multicast destination address.

The computing system 100 may include at least one host (e.g., hosts 102, 104, 106), at least one multicast router 108, and at least one distributed switch 110. The distributed switch 110 may include at least one master distributed switch element 112 with at least one snooper 114 and at least one master switch forwarding unit 116. The distributed switch 110 may further include at least one slave distributed switch element 118 with at least one slave switch forwarding unit 120. Indeed, the distributed switch element 110 may include a plurality of the slave distributed switch element 118, a plurality of the master switch forwarding unit 116, and a plurality of the slave switch forwarding unit 120, as illustrated in connection with FIG. 2. Each of the hosts 102, 104, 106, the multicast router 108, and the distributed switch 110 may be coupled via a network, such as an Ethernet network.

Each of the hosts 102, 104, 106 may be any suitable computational device such as a personal computer, a workstation, a client, a server, a mainframe, a hand held computer, a palm top computer, a telephony device, a network appliance, a blade computer, other computer, or any combination thereof. The hosts 102, 104, 106 may be configured to send and receive multicast packets. In particular, the host 102 may be a server acting as a multicast sender that sends at least one multicast packet to a multicast destination address for the members of that group. Each of the hosts 104, 106 may be a client that has joined the group identified by the multicast destination address in order to receive the multicast packets. As such, each of the hosts 104, 106 may act as a multicast listener that receives the multicast packet from the host 102.

The multicast router 108 may be any suitable device configured to route multicast packets. Moreover, the multicast router 108 may be configured to act as a querier, such as an IGMP querier or MLD querier, and may initiate and forward queries, such as IGMP or MLD queries, that are general queries, group specific queries, or any combination thereof. The IGMP or MLD queries may include IGMP or MLD packets.

Of note, IGMP packets and MLD packets associated with queries and multicast membership information may be different than the multicast packets of data sent to multicast destination addresses. Moreover, IGMP may be, but is not limited to, being a component of the Internet Protocol Version 4 (IPv4). MLD may be, but is not limited to, being a component of the Internet Protocol Version 6 (IPv6). Moreover, other communications protocols or other versions of IGMP and MLD may be utilized.

In particular, the multicast router 108 may initiate and send a general query soliciting substantially all hosts to provide substantially all multicast membership information. In other words, hosts are to report all groups they are members of in response to the general query. The general query may be sent by the multicast router 108 to an all host group that each host joins when it comes online. The general query may be sent based on an interval. The interval may be configurable, and may be set to about 1 second up to about 65535 seconds. In one embodiment, the interval may be set to about 125 seconds. The multicast router 108 may also initiate and send a group specific query. For example, if a host indicates it wants to leave a group, the multicast router 108 may initiate and send the group specific query to the multicast destination address of that group to solicit the membership of that group. A group may have zero or more members.

Each of the hosts 104, 106 may respond to the general query and the group specific query with the multicast membership information. For example, each of the hosts 104, 106 may reply with an IGMP or MLD report for each of the groups to which it is a member. The IGMP or MLD report may include IGMP or MLD packets. Each of the hosts 104, 106 may also send an unsolicited IGMP or MLD report when it joins a group. Each of the hosts 104, 106 may join one or more groups, and may leave one or more groups.

The snooper 114 of the distributed switch 110 may be an IGMP or MLD snooper that "listens" to the IGMP or MLD communication between the hosts 104, 106 and the querier (e.g., the multicast router 108 or the distributed switch 110). As such, the snooper 114 may learn from the IGMP or MLD reports the multicast membership information, such as which hosts are associated with which multicast destination addresses.

The distributed switch 110 may be any suitable distributed switch configured to distribute forwarding functionality across a plurality of switch forwarding units, such as the master switch forwarding unit 116 and the slave switch forwarding unit 120, that are programmed on a "need to know" basis. Indeed, the distributed switch 110 may be practically any distributed switch that utilizes a "need-to-know" programming algorithm. The distributed switch 110 may be a layer two (L2) distributed switch. For example, the distributed switch 110 may be a distributed L2 switch, and the master switch forwarding unit 116 and the slave switch forwarding unit 120 may be a distributed virtual Ethernet bridge (dVEB). The distributed switch may include layer 2 functionality, layer 3 functionality, or any combination thereof.

The distributed switch 110 may also act as the querier, such as the IGMP or MLD querier, instead of the multicast router 108, and initiate and forward queries, such as IGMP or MLD queries, that are general queries based on an interval or group specific queries. In response to a miss event, the distributed switch 110 may act as a querier that initiates and forwards queries, such as IGMP or MLD queries, that are general queries without the interval or group specific queries. For example, the distributed switch 110 may initiate and forward a general query before the next interval in response to the miss event.

More specifically, either the master distributed switch element 112 or the slave distributed switch element 118 may act as the querier, and initiate and forward the queries. For example, the firmware (illustrated in FIG. 2) corresponding with the master distributed switch element 112 or the slave distributed switch element 118 may initiate the query in response to the miss event, and the master switch forwarding unit 116 of the master distributed switch element 112 or the slave switch forwarding unit 120 of the slave distributed switch element 118 may forward the query to the hosts. Indeed, the master switch forwarding unit 116 and the slave switch forwarding unit 120 may be programmed on a "need to know" basis, forward multicast packets to hosts, forward IGMP or MLD packets to hosts, and generate miss events.

Afterwards, the multicast router 108 may resume its duties as a querier, and initiate and forward general queries based on the interval or group specific queries. However, it is possible to temporarily have multiple queriers on the network. If the distributed switch 110 was the querier before the miss event, and not the multicast router 108, then the distributed switch 110 may initiate and forward general queries based on the interval or group specific queries.

Figure 2:
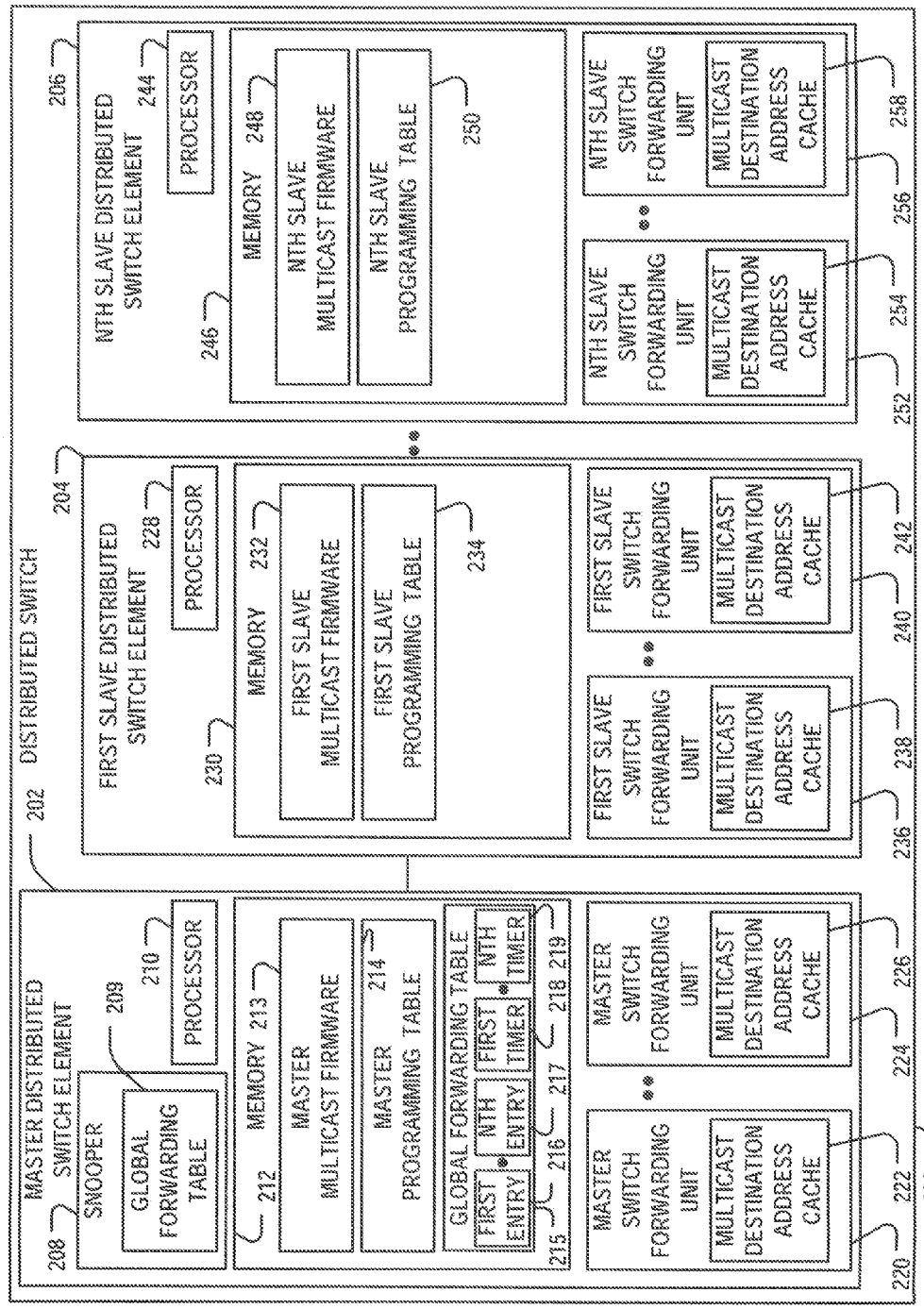
FIG. 2 is a block diagram illustrating in greater detail the primary hardware and firmware entities used to implement an embodiment of a distributed switch consistent with the computing system of FIG. 1.

FIG. 2 illustrates the primary hardware and firmware entities used to implement an apparatus that includes at least one processor and program code configured to be executed by the at least one processor. The apparatus may be an embodiment of a distributed switch 200 similar to the distributed switch 110 of FIG. 1. The distributed switch 200 may include a master distributed switch element 202 with a snooper 208 and master switch forwarding units 220, 224 that may be similar to the master distributed switch element 112 with the snooper 114 and the master forwarding unit 116 of FIG. 1, respectively. The master distributed switch element 202 also may include a processor 210 and a memory 212. The processor 210, the memory 212, and the master switch forwarding units 220, 224 may be coupled directly or indirectly by a bus.

The distributed switch 200 may further include a first slave distributed switch element 204 and a nth slave distributed switch element 206, both of which are similar to the slave distributed switch element 118 of FIG. 1. Moreover, the first slave switch forwarding units 236, 240 and the nth slave switch forwarding units 252, 256 may be similar to the slave switch forwarding unit 120 of FIG. 1. The first slave distributed switch element 204 includes a processor 228 and a memory 230. The processor 228, the memory 230, and the first slave switch forwarding units 236, 240 may be coupled by a bus. The nth slave distributed switch element 206 includes a processor 244 and a memory 246. The processor 244, the memory 246, and the slave switch forwarding units 252, 256 may be coupled directly or indirectly by a bus.

Each of the memories 212, 230, 246 may include multicast firmware, such as master multicast firmware 213, first slave multicast firmware 232, and nth slave multicast firmware 248, respectively. The multicast firmware may be a layer of code running in the distributed switch element that may perform read operations, write operations, or any combination thereof in the switch forwarding units 220, 224, 236, 240, 252, 256. Indeed, a single multicast firmware component may manage the read operations, write operations, or any combination thereof for a subset of the switch forwarding units 220, 224, 236, 240, 252, 256 of the distributed switch 200. The master multicast firmware 213, first slave multicast firmware 232, and nth slave multicast firmware 248 may be program code configured to be executed by the processors 210, 228, 244, respectively.

The snooper 208 may communicate with the master multicast firmware 213. The master multicast firmware 213 and the slave multicast firmware, such as the first slave multicast firmware 232 and nth slave multicast firmware 248, may communicate with each other. The master multicast firmware 213, the first slave multicast firmware 232, and the nth slave multicast firmware 248 may also initiate queries, such as IGMP or MLD queries, that are general queries, group specific queries, or any combination thereof in response to a miss event.

The memories 212, 230, 246 may also include programming tables 214, 234, 250 that may indicate which multicast destination addresses and corresponding multicast membership information is programmed in the corresponding switch forwarding units 220, 224, 236, 240, 252, 256. Indeed, the programming tables may have a plurality of entries, with each entry having a multicast destination address and multicast membership information (e.g., which indicates which hosts or ports are members of the multicast group that corresponds to the multicast destination address).

Each of the switch forwarding units 220, 224, 236, 240, 252, 256 may be hardware with physical ports for attaching to hosts, such as the hosts 102, 104, 106 of FIG. 1. Indeed, the switch forwarding units 220, 224, 236, 240, 252, 256 are programmed with multicast membership information of multicast destination addresses on a "need to know" basis, and packets are forwarded by the switch forwarding units 220, 224, 236, 240, 252, 256 to the attached hosts 102, 104, 106 of FIG. 1. In one embodiment, the distributed switch 200 may be a distributed L2 switch, the switch forwarding units 220, 224, 236, 240, 252, 256 may be dVEBs, and the dVEBs are programmed with multicast membership information on a "need-to-know" basis.

Each of the switch forwarding units 220, 224, 236, 240, 252, 256 may also generate a miss event. The miss event may be an interrupt (e.g., hardware interrupt) generated by the switch forwarding units 220, 224, 236, 240, 252, 256 to the corresponding multicast firmware 213, 232, 248, respectively. The miss event may be generated when one of the switch forwarding units 220, 224, 236, 240, 252, 256 has a "need to know" the multicast membership information of a multicast destination address, but the multicast destination address is not registered in the respective multicast destination address cache 222, 226, 238, 242, 254, 258. A multicast destination address may be registered when it is stored (e.g., with the corresponding multicast membership information) in at least one of the multicast destination address caches 222, 226, 238, 242, 254, 258.

Each of the switch forwarding units 220, 224, 236, 240, 252, 256 may include multicast destination address caches 222, 226, 238, 242, 254, 258, respectively, in hardware indicating the multicast destination addresses that are programmed into the hardware of the corresponding switch forwarding unit. In particular, each of the caches may have a plurality of entries, with each entry having a multicast destination address, multicast membership information (e.g., which indicates which hosts or ports are members of the multicast group that corresponds to the multicast destination address), and a hit status. When the corresponding switch forwarding unit, also hardware, performs any packet forwarding functionality for a given multicast destination address, the hit status for that entry may indicate the forwarding (e.g., a hit status may be set to true and/or a bit may be utilized). The corresponding multicast firmware can check the hit status to determine if the corresponding switch forwarding unit has performed packet forwarding. As the hit status may be at the hardware cache level, the hit bit may be set by hardware, such as the corresponding switch forwarding unit, and checked and reset by the corresponding multicast firmware.

From a very general sense, "cache" may simply refer to the multicast destination addresses that are stored in hardware. However, although the term "cache" is utilized herein, those of ordinary skill in the art may appreciate that the cache may alternatively be memory, content addressable memory (CAM), or any combination thereof. Thus, the multicast destination address caches 222, 226, 238, 242, 254, 258 may be multicast destination address CAM's 222, 226, 238, 242, 254, 258, respectively, and the scope of the claims should not be limited by the use of the term "cache" herein.

The master distributed switch element 202 may also include at least one global forwarding table 215 maintained by the master multicast firmware 213 of multicast destination addresses and corresponding multicast membership information learned by the snooper 208. In particular, the global forwarding table 215 is populated from snooped multicast membership information along with the corresponding multicast destination address. The global forwarding table 215 may include a plurality of entries, such as a first entry 216 and a nth entry 217, and each entry may include a timer, such as a first timer 218 to correspond with the first entry 216 and a nth timer 219 to correspond with nth entry 217. The timers may keep track of aging time and may serve the purpose of determining entries that have "aged out." The entries that have aged out may be cast-out candidates. Indeed, age out and cast-out may be utilized interchangeably herein. Each of the entries 216, 217 may include a multicast destination address and its corresponding multicast membership information.

The global forwarding table may be built through communication with the snooper 208, and the snooper 208 may decide when a multicast destination address should be added as an entry or removed as an entry from the global forwarding table 215. To that end, the snooper 208 may also have a global forwarding table 209 that is identical to and synchronized with the global forwarding table 215 of the master multicast firmware 215. In particular, the snooper 208 may be the only entity with the authority to add or remove entries, and it may add or remove entities in the global forwarding table 209 and then communicate the addition or removal to the master multicast firmware 213 for synchronization of the global forwarding table 215. In some embodiments, a particular entry may have a timer in both the global forwarding table 209 and the global forwarding table 215. Alternatively, the timer may be in the global forwarding table 215. In the latter alternative, the snooper 208 may periodically make inquiries to the master multicast firmware 213 regarding the timer.

Figure 3:
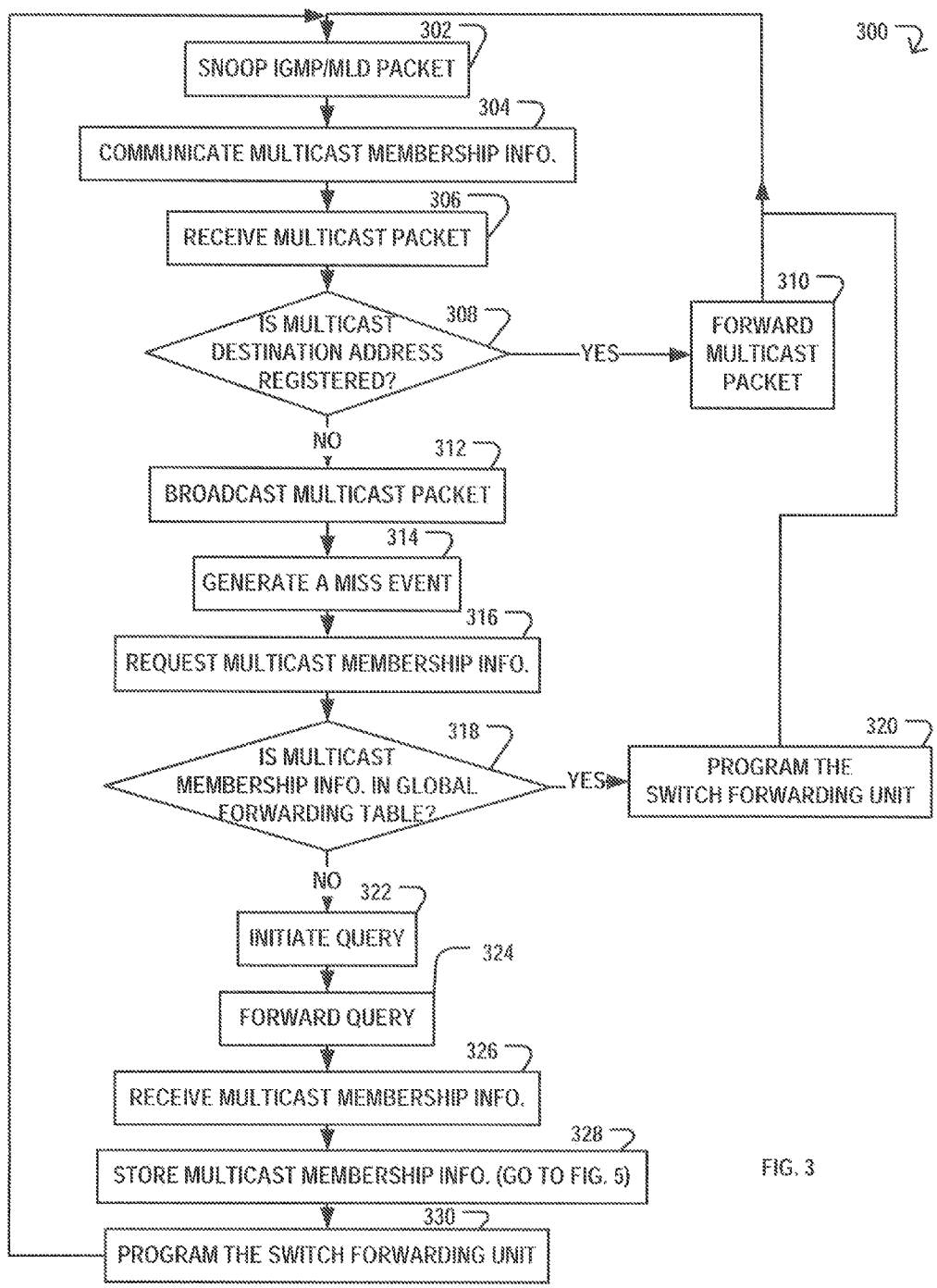
FIG. 3 is a flowchart of an embodiment of a method of requesting multicast membership information of a group identified by a multicast destination address in a distributed switch.

It is worth noting that while the specific format and implementation may vary, a certain multicast destination address and its corresponding multicast membership information may be stored in a variety of locations, for example, in the global forwarding table 215 (as well as the global forwarding table 209), in a programming table, such as the programming tables 214, 234, 250, and in a multicast destination address cache, such as the multicast destination address caches 222, 226, 238, 242, 254, and 258. As specific members (or ports) are joining or leaving a given multicast group, the multicast destination address and corresponding multicast membership information may get updated in all four locations. Thus, each of the four locations may have an entry for the multicast destination address and the corresponding multicast membership information FIG. 3 shows an embodiment of a method 300 of requesting multicast membership information of a group identified by a multicast destination address in a distributed switch. In method 300, a query is initiated (a) in response to a miss event and (b) the snooper has no knowledge of multicast membership information for a given multicast address (e.g., no knowledge in the global forwarding table). Proceeding to 302, at least one IGMP or MLD packet of an IGMP or MLD report may be snooped. For example, the multicast router 108 of FIG. 1 may issue the general query at the set interval or a group specific query, and the hosts 104, 106 may respond with an IGMP or MLD report with the multicast membership information. The snooper 114 of FIG. 1 or the snooper 208 of FIG. 2 may snoop the IGMP or MLD packet of the IGMP or MLD report. Moreover, at the hardware level, filters may be set such that any IGMP or MLD packet may be snooped by the snooper 208, even if not at the interval. For example, any unsolicited IGMP or MLD report packets that may be received when a host comes on the network and wants to join a group may be snooped by the snooper 208.

The multicast membership information from the snooping may be communicated at 304. For example, the snooper 114 of FIG. 1 or the snooper 208 of FIG. 2 may decide to add a new entry to its global forwarding table 209 and may communicate with the master multicast firmware 213 to add the snooped multicast membership information and corresponding multicast destination address to the global forwarding table 215 to keep the tables synchronized. After the multicast membership information is stored in the global forwarding table 215 by the master multicast firmware 213, the multicast membership information may be retrieved by the master multicast firmware 213 for programming its master switch forwarding units 220, 224, or to provide to the first slave multicast firmware 232 for programming its first slave switch forwarding units 236, 240, or to provide to the nth slave multicast firmware 232 for programming its nth slave switch forwarding units 252, 256, on a "need to know" basis.

At least one multicast packet may be received at 306. For example, the host 102 of FIG. 1 may send a multicast packet to members of the group identified by the multicast destination address of the multicast packet. One of the master switch forwarding units 220, 224, first slave switch forwarding units 236, 240, or the nth switch forwarding units 252, 256 may receive the multicast packet based on the physical ports. For simplicity, it is assumed that the first slave switch forwarding unit 236 receives the multicast packet.

Proceeding to 308, a determination is made as to whether the multicast destination address of the multicast packet is registered. For example, the multicast destination address cache 238 of the first slave switch forwarding unit 236 of FIG. 2 may be searched for the multicast destination address of the multicast packet. Registration may indicate that the first slave switch forwarding unit 236 has been programmed with the multicast membership information and the multicast destination address.

When the multicast destination address is registered, the slave switch forwarding unit 236 of FIG. 2 forwards the multicast packet at 310 based on the multicast membership information, such as to any hosts that are members of the group identified by the multicast destination address. A hit status may also be set to true in the corresponding multicast destination address cache at 310 to indicate the forwarding to the registered multicast destination address, as will be discussed further in connection with FIG. 5. Control may proceed to 302.

When the multicast destination address is not registered, the multicast packet may be broadcasted at 312. For example, the first slave switch forwarding unit 236 of FIG. 2 may broadcast or flood the multicast packet to substantially all hosts in the broadcast domain to ensure that any hosts that are members of the group identified by the unregistered multicast destination address receive the multicast packet. The broadcast domain may be configurable, and may include up to all hosts coupled to the distributed switch 200.

A miss event may be generated at 314. In particular, the miss event may be generated by the switch forwarding unit that has a "need to know" but is not programmed with the multicast destination address. The miss event is generated to the switch forwarding unit's corresponding multicast firmware. For example, the first slave switch forwarding unit 236 of FIG. 2 may generate the miss event to the first slave multicast firmware 232 indicating that it has a "need to know" the multicast membership information of the multicast destination address of the multicast packet.

The multicast membership information may be requested at 316. The generated miss event not only notifies of the "need to know" status for an unregistered multicast destination address, but the multicast membership information of the unregistered multicast destination address may be requested in response to the miss event. When the miss event is generated in any of the first slave switch forwarding units 236, 240 of FIG. 2 or in the nth slave switch forwarding units 252, 256, the corresponding first slave multicast firmware 232 or nth slave multicast firmware 248 may communicate with the master multicast firmware 213 to request the multicast membership information. When the miss event is generated in one of the master switch forwarding units 220, 224, the master multicast firmware 213 does not have to request from another entity. For example, in response to the miss event generated in the first slave switch forwarding unit 236, the first slave multicast firmware 232 of FIG. 2 may request the multicast membership information, on behalf of the first slave switch forwarding unit 236, from the master multicast firmware 213 of the master distributed switch element 202.

Proceeding to 318, a determination may be made as to whether the multicast membership information is stored in the global forwarding table. In particular, even though the switch forwarding unit may not be programmed, the multicast membership information of the multicast destination address may be in the global forwarding table. As such, the global forwarding table may be searched for the multicast membership information of the unregistered multicast destination address, even if it is not the most current multicast membership information. For example, the master multicast firmware 213 of the master distributed switch element 202 of FIG. 2 may search the entries 216, 217 of the global forwarding table 215 for the multicast membership information.

When the multicast membership information is found in the global forwarding table 215, and the miss event is generated in any of the first slave switch forwarding units 236, 240 or in the nth slave switch forwarding units 252, 256, then the corresponding first slave multicast firmware 232 or nth slave multicast firmware 248 may receive the multicast membership information. The corresponding first slave multicast firmware 232 or nth slave multicast firmware 248 may update the corresponding first slave programming table 234 or the nth slave programming table 250 with the multicast membership information and the multicast destination address. The multicast destination address and the multicast membership information may be programmed in the switch forwarding unit of the first slave switch forwarding units 236, 240 or nth slave switch forwarding units 252, 256 that generated the miss event.

When the multicast membership information is found in the global forwarding table 215 and the miss event was generated in the master switch forwarding units 220, 224, the corresponding master multicast firmware 213 may receive the multicast membership information and update the master programming table 214 with the multicast membership information and the multicast destination address. The multicast membership information may be programmed in the switch forwarding unit of the master switch forwarding units 220, 224 that generated the miss event.

For example, in response to the miss event generated in the first slave switch forwarding unit 236, the corresponding first slave multicast firmware 232 may receive from the master multicast firmware 213 the multicast membership information from the global forwarding table 215. The corresponding first slave multicast firmware 232 may update the corresponding first slave programming table 234. At 320, the multicast membership information may be programmed in the first slave switch forwarding unit 236, and control may pass to 302.

When the multicast membership information is not found in the global forwarding table 215, control may proceed to 322 to initiate a query. When the multicast membership information is not found in the global forwarding table 215, the master multicast firmware 213 may initiate a query, such as an IGMP or MLD query, that is a general query or a group specific query. At least one of the master switch forwarding units 220, 224 may forward the query to the hosts. Alternatively, the slave multicast firmware, such as the first slave multicast firmware 232 and the nth slave multicast firmware 248, may initiate the query, and at least one of the corresponding first slave switch forwarding units 236, 240 or nth slave switch forwarding units 252, 256 may forward the query to the hosts.

Multicast membership information may be received at 324. For example, the hosts may respond with reports of IGMP or MLD packets conveying the multicast membership information and the snooper 114 of FIG. 1 or the snooper 208 of FIG. 2 may snoop, as previously discussed in connection with 302.

The received multicast membership information may be stored at 328. For example, the snooper 114 of FIG. 1 or the snooper 208 of FIG. 2 may decide to add a new entry to its global forwarding table 209 and may communicate with the master multicast firmware 213 to add the snooped multicast membership information and corresponding multicast destination address to the global forwarding table 215 to keep the tables synchronized, as discussed in connection with 304. Of note, reference is made to FIG. 5 for a more detailed discussion of an embodiment of a method of managing a global forwarding table in a distributed switch.

The switch forwarding unit is programmed at 330. When the miss event is generated in any of the first slave switch forwarding units 236, 240 or in the nth slave switch forwarding units 252, 256, then the corresponding first slave multicast firmware 232 or nth slave multicast firmware 248 may receive the multicast membership information. The corresponding first slave multicast firmware 232 or nth slave multicast firmware 248 may update the corresponding first slave programming table 234 or the nth slave programming table 250 with the multicast membership information and the multicast destination address. The multicast destination address and the multicast membership information may be programmed in the switch forwarding unit of the first slave switch forwarding units 236, 240 or nth slave switch forwarding units 252, 256 that generated the miss event, as well as in the corresponding multicast destination address cache 238, 242, 24, 258, at 330.

When the miss event was generated in the master switch forwarding units 220, 224, the corresponding master multicast firmware 213 may receive the multicast membership information and update the master programming table 214 with the multicast membership information and the multicast destination address. The multicast membership information and the multicast membership information may be programmed in the switch forwarding unit of the master switch forwarding units 220, 224 that generated the miss event, as well as in the corresponding multicast destination address cache 222, 226, at 330.

For example, in response to the miss event generated in the first slave switch forwarding unit 236, the corresponding first slave multicast firmware 232 may receive from the master multicast firmware 213 the multicast membership information from the global forwarding table 215. The corresponding first slave multicast firmware 232 may update the corresponding first slave programming table 234. At 330, the multicast membership information may be programmed in the first slave switch forwarding unit 236, and the multicast destination address cache 238 may be updated with the multicast destination address and the corresponding multicast membership information. Control may proceed to 302.

Those of ordinary skill may appreciate that the next time that a multicast packet is received, the corresponding multicast destination address may be registered at 308, and the multicast packet may be forwarded to the intended hosts at 310 without broadcasting at 312. Moreover, the switch forwarding unit may directly forward the multicast packet based on the programmed multicast destination address and multicast membership information without communications with multicast firmware or the snooper. Indeed, after the multicast membership information is stored in the global forwarding table 215 by the master multicast firmware 213, the multicast membership information may be retrieved by the master multicast firmware 213 for programming its master switch forwarding units 220, 224, or to provide to the first slave multicast firmware 232 for programming its first slave switch forwarding units 236, 240, or to provide to the nth slave multicast firmware 232 for programming its nth slave switch forwarding units 252, 256 on a "need to know" basis.

Figure 4:
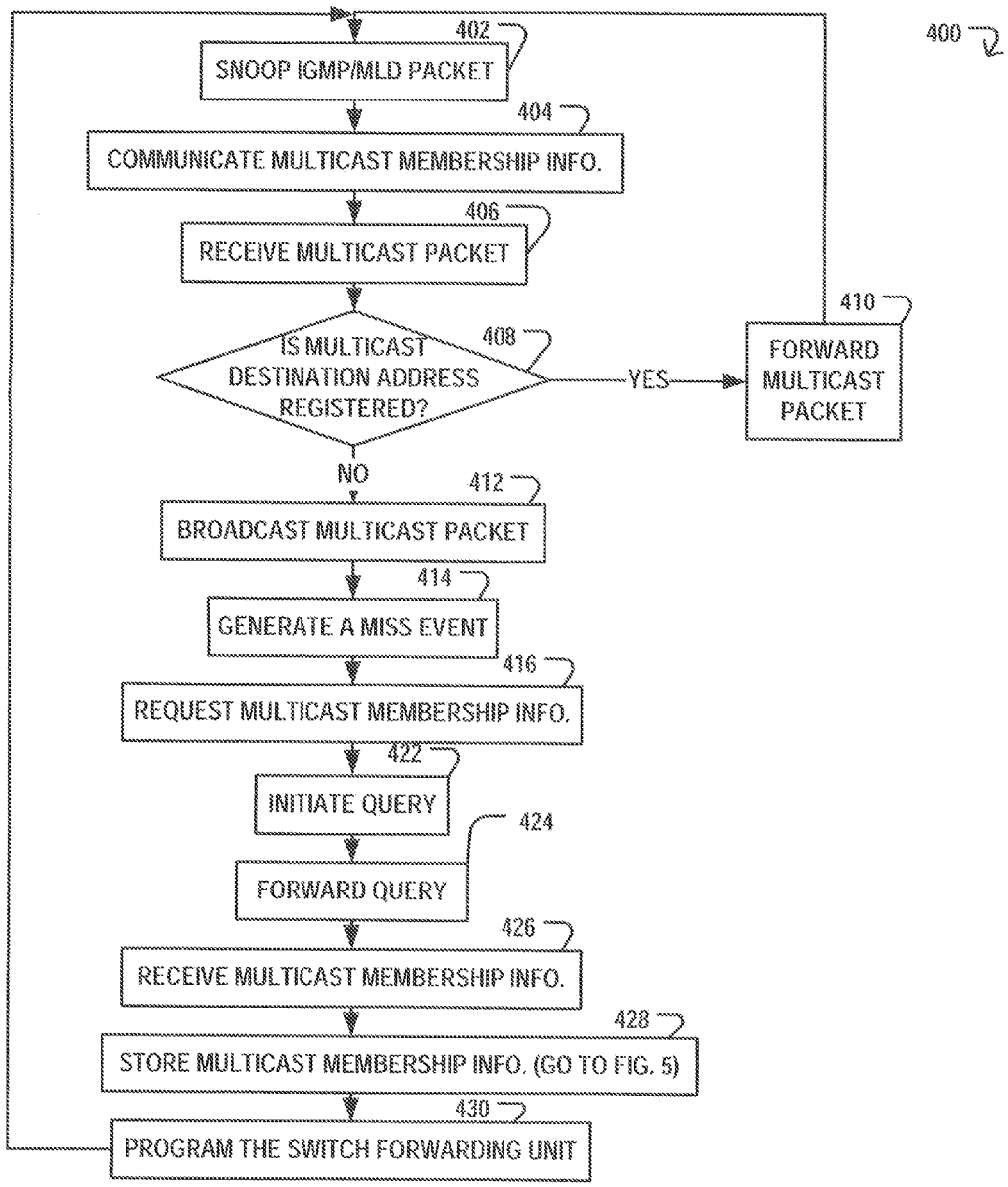
FIG. 4 is a flowchart of another embodiment of a method of requesting multicast membership information of a group identified by a multicast destination address in a distributed switch.

FIG. 4 shows an embodiment of a method 400 of requesting multicast membership information of a group identified by a multicast destination address in a distributed switch. In method 400, a query is initiated in response to a miss event. For example, a query may be initiated substantially every time a miss event is generated. Proceeding to 402, at least one IGMP or MLD packet of an IGMP or MLD report may be snooped. For example, the multicast router 108 of FIG. 1 may issue the general query at the set interval or a group specific query, and the hosts 104, 106 may respond with an IGMP or MLD report with the multicast membership information. The snooper 114 of FIG. 1 or the snooper 208 of FIG. 2 may snoop the IGMP or MLD packet of the IGMP or MLD report. Moreover, at the hardware level, filters may be set such that any IGMP or MLD packet may be snooped by the snooper 208, even if not at the interval. For example, any unsolicited IGMP or MLD report packets that may be received when a host comes on the network and wants to join a group may be snooped by the snooper 208.

The multicast membership information from the snooping may be communicated at 404. For example, the snooper 114 of FIG. 1 or the snooper 208 of FIG. 2 may decide to add a new entry to its global forwarding table 209 and may communicate with the master multicast firmware 213 to add the snooped multicast membership information and corresponding multicast destination address to the global forwarding table 215 to keep the tables synchronized. After the multicast membership information is stored in the global forwarding table 215 by the master multicast firmware 213, the multicast membership information may be retrieved by the master multicast firmware 213 for programming its master switch forwarding units 220, 224, or to provide to the first slave multicast firmware 232 for programming its first slave switch forwarding units 236, 240, or to provide to the nth slave multicast firmware 232 for programming its nth slave switch forwarding units 252, 256, on a "need to know" basis.

At least one multicast packet may be received at 406. For example, the host 102 of FIG. 1 may send a multicast packet to members of the group identified by the multicast destination address of the multicast packet. One of the master switch forwarding units 220, 224, first slave switch forwarding units 236, 240, or the nth switch forwarding units 252, 256 may receive the multicast packet based on the physical ports. For simplicity, it is assumed that the first slave switch forwarding unit 236 receives the multicast packet.

Proceeding to 408, a determination is made as to whether the multicast destination address of the multicast packet is registered. For example, the multicast destination address cache 238 of the first slave switch forwarding unit 236 of FIG. 2 may be searched for the multicast destination address of the multicast packet. Registration may indicate that the first slave switch forwarding unit 236 has been programmed with the multicast membership information and the multicast destination address.

When the multicast destination address is registered, the slave switch forwarding unit 236 of FIG. 2 forwards the multicast packet at 410 based on the multicast membership information, such as to any hosts that are members of the group identified by the multicast destination address. A hit status may also be set to true in the corresponding multicast destination address cache at 410 to indicate the forwarding to the registered multicast destination address, as will be discussed further in connection with FIG. 5. Control may proceed to 402.

When the multicast destination address is not registered, the multicast packet may be broadcasted at 412. For example, the first slave switch forwarding unit 236 of FIG. 2 may broadcast or flood the multicast packet to substantially all hosts in the broadcast domain to ensure that the any hosts that are members of the group identified by the unregistered multicast destination address receive the multicast packet. The broadcast domain may be configurable, and may include up to all hosts coupled to the distributed switch 200.

A miss event may be generated at 414. In particular, the miss event may be generated by the switch forwarding unit that has a "need to know" but is not programmed with the multicast destination address. The miss event is generated to the switch forwarding unit's corresponding multicast firmware. For example, the first slave switch forwarding unit 236 of FIG. 2 may generate the miss event to the first slave multicast firmware 232 indicating that it has a "need to know" the multicast membership information of the multicast destination address of the multicast packet.

The multicast membership information may be requested at 416. The generated miss event not only notifies of the "need to know" status for an unregistered multicast destination address, but the multicast membership information of the unregistered multicast destination address may be requested in response to the miss event. When the miss event is generated in any of the first slave switch forwarding units 236, 240 of FIG. 2 or in the nth slave switch forwarding units 252, 256, the corresponding first slave multicast firmware 232 or nth slave multicast firmware 248 may communicate with the master multicast firmware 213 to request the multicast membership information. When the miss event is generated in one of the master switch forwarding units 220, 224, the master multicast firmware 213 does not have to request from another entity. For example, in response to the miss event generated in the first slave switch forwarding unit 236, the first slave multicast firmware 232 of FIG. 2 may request the multicast membership information, on behalf of the first slave switch forwarding unit 236, from the master multicast firmware 213 of the master distributed switch element 202.

At 322, a query may be initiated. The master multicast firmware 213 may initiate a query, such as an IGMP or MLD query, that is a general query or a group specific query. At least one of the master switch forwarding units 220, 224 may forward the query to the hosts. Alternatively, the slave multicast firmware, such as the first slave multicast firmware 232 and the nth slave multicast firmware 248, may initiate the query, and at least one of the corresponding first slave switch forwarding units 236, 240 or nth slave switch forwarding units 252, 256 may forward the query to the hosts.

Multicast membership information may be received at 424. For example, the hosts may respond with reports of IGMP or MLD packets conveying the multicast membership information and the snooper 114 of FIG. 1 or the snooper 208 of FIG. 2 may snoop, as previously discussed in connection with 402.

The received multicast membership information may be stored at 428. For example, the snooper 114 of FIG. 1 or the snooper 208 of FIG. 2 may decide to add a new entry to its global forwarding table 209 and may communicate with the master multicast firmware 213 to add the snooped multicast membership information and corresponding multicast destination address to the global forwarding table 215 to keep the tables synchronized, as discussed in connection with 404. Of note, reference is made to FIG. 5 for a more detailed discussion of an embodiment of a method of managing a global forwarding table in a distributed switch.

The switch forwarding unit is programmed at 430. When the miss event is generated in any of the first slave switch forwarding units 236, 240 or in the nth slave switch forwarding units 252, 256, then the corresponding first slave multicast firmware 232 or nth slave multicast firmware 248 may receive the multicast membership information. The corresponding first slave multicast firmware 232 or nth slave multicast firmware 248 may update the corresponding first slave programming table 234 or the nth slave programming table 250 with the multicast membership information and the multicast destination address. The multicast destination address and the multicast membership information may be programmed in the switch forwarding unit of the first slave switch forwarding units 236, 240 or nth slave switch forwarding units 252, 256 that generated the miss event, as well as in the corresponding multicast destination address cache 238, 242, 24, 258, at 430.

When the miss event was generated in the master switch forwarding units 220, 224, the corresponding master multicast firmware 213 may receive the multicast membership information and update the master programming table 214 with the multicast membership information and the multicast destination address. The multicast membership information and the multicast membership information may be programmed in the switch forwarding unit of the master switch forwarding units 220, 224 that generated the miss event, as well as in the corresponding multicast destination address cache 222, 226, at 430.

For example, in response to the miss event generated in the first slave switch forwarding unit 236, the corresponding first slave multicast firmware 232 may receive from the master multicast firmware 213 the multicast membership information from the global forwarding table 215. The corresponding first slave multicast firmware 232 may update the corresponding first slave programming table 234. At 430, the multicast membership information may be programmed in the first slave switch forwarding unit 236, and the multicast destination address cache 238 may be updated with the multicast destination address and the corresponding multicast membership information. Control may proceed to 402.

Those of ordinary skill may appreciate that the next time that a multicast packet is received, the corresponding multicast destination address may be registered at 408, and the multicast packet may be forwarded to the intended hosts at 410 without broadcasting at 412. Moreover, the switch forwarding unit may be to directly forward the multicast packet based on the programmed multicast destination address and multicast membership information without communications with multicast firmware or the snooper. Indeed, after the multicast membership information is stored in the global forwarding table 215 by the master multicast firmware 213, the multicast membership information may be retrieved by the master multicast firmware 213 for programming its master switch forwarding units 220, 224, or to provide to the first slave multicast firmware 232 for programming its first slave switch forwarding units 236, 240, or to provide to the nth slave multicast firmware 232 for programming its nth slave switch forwarding units 252, 256 on a "need to know" basis.

Those of ordinary skill in the art may appreciate that via the method 300 of FIG. 3 and the method 400 of FIG. 4, the distributed switch, or a master distributed switch element or slave distributed switch element thereof, may temporarily act as querier when an unregistered multicast destination address is encountered and a miss event is generated. As such, the learning of the most current multicast membership information of a multicast destination address may be expedited instead of waiting for the expiry of the configured query interval, which may be set from about 1 second to about 65535 seconds, as the next opportunity for the snooper to "learn" the most current multicast membership information. Moreover, expediting the learning of multicast membership information may reduce bandwidth wastage caused by flooding, may improve accuracy in forwarding multicast packet(s) to their intended destination(s), and may increase the likelihood that more current or the most current multicast membership information of a multicast destination address is learned and utilized for forwarding.

Figure 5:
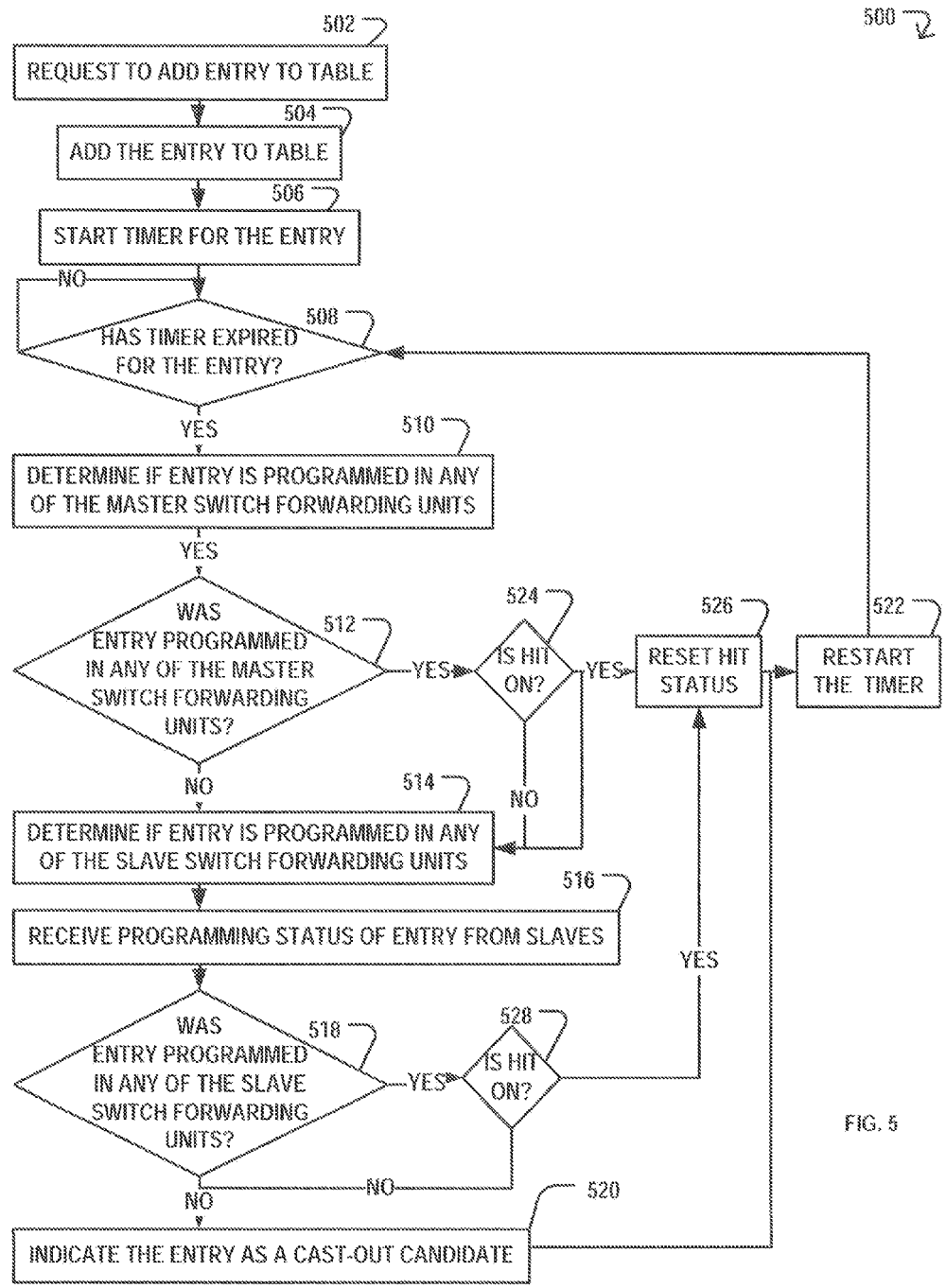
FIG. 5 is a flowchart of an embodiment of a method of managing a global forwarding table in a distributed switch.

FIG. 5 shows an embodiment of a method of managing a global forwarding table in a distributed switch. As discussed above in connection FIG. 3 and FIG. 4, in response to the miss event, the master distributed switch element 202 of FIG. 2, the first slave distributed switch element 204, or the nth slave distributed switch element 206 may serve as a querier. The corresponding multicast firmware of the switch element initiates a general query or a group specific query, and the corresponding switch forwarding unit forwards the query to the appropriate hosts. In response to the query, the hosts may send reports that the snooper 208 snoops to learn the multicast membership information.

The snooper 208 may be the only entity with the authority to add or remove entries, and it may add or remove entities in the global forwarding table 209 and then communicate the addition or removal to the master multicast firmware 213 for synchronization of the global forwarding table 215. In some embodiments, a particular entry may have a timer in both the global forwarding table 209 and the global forwarding table 215. Alternatively, the timer may be in the global forwarding table 215. In the latter alternative, the snooper 208 may periodically make inquiries to the master multicast firmware 213 regarding the timer. For ease of explanation, it is assumed in FIG. 5 that the global forwarding table 215 is being managed and the timer is only in the global forwarding table 215.

However, those of ordinary skill in the art will appreciate that it is the global forwarding table 209 that may be managed with one timer, that it is the global forwarding table 215 that may be managed with timers in both tables, that it is the global forwarding table 215 that may be managed with one timer, etc. For example, a global forwarding table may be managed by a snooper of the distributed switch, a global forwarding table may be managed by master multicast firmware of a master distributed switch element of the distributed switch, or any combination thereof. Indeed, there may be other variations, for example, 502 may be omitted in some embodiments. Moreover, although the embodiment of the method 500 of FIG. 5 is described in connection with snooped multicast membership information in reports received in response to the query initiated by the miss event, the method 500 may be performed at practically any other time when multicast membership information is received from a host (e.g., a report in response to a general query based at the interval or an unsolicited report sent by a host).

Proceeding with 502, a request to add an entry to a table is issued. For example, the snooper 208 of FIG. 2 may have snooped IGMP or MLD communication, such as snooping reports between the multicast router 108 of FIG. 1 and one or more of its attached hosts, or snooping reports in response to a query initiated and forwarded in response to a miss event. Nonetheless, the snooper 208 may determine that there is a new multicast group membership (e.g. a new multicast destination address that was previously unknown) and adds the entry to its global forwarding table 209. The snooper 208 may communicate the new multicast group membership to the master multicast firmware 213.

The entry is added to the table at 504. For example, the multicast firmware 213 of FIG. 2 may add the first entry 216 to the global forwarding table 215 for the new multicast group membership communicated by the snooper 208. The first entry 216 may include a new multicast destination address and may include at least one host that is a member of the group identified by the multicast destination address.

A timer is started for the entry at 506. For example, the master multicast firmware 213 of FIG. 2 may start the first timer 218 for the first entry 216. Of note, each entry in the table may have a unique timer associated with it. In some embodiments, the first timer 218 may be started after the multicast destination address and multicast membership information of the entry are programmed in the switch forwarding unit that generated the miss event. However, in some embodiments, the first timer 218 may be started before the multicast destination address and multicast membership information of the first entry 216 is programmed in the switch forwarding unit that generated the miss event. Nonetheless, any of the switch forwarding units 220, 224, 236, 240, 252, 256 may be programmed with the multicast destination address and corresponding multicast membership information of the first entry 216 from the global forwarding table 215 when it has a "need to know."

Proceeding to 508, a determination is made as to whether the timer has expired. For example, the master multicast firmware 213 of FIG. 2 may determine whether the first timer 218 has expired. As long as the first timer 218 does not expire, the master multicast firmware 213 may continue to determine if the first timer 218 has expired. When the first timer 218 expires, a determination is made as to whether the first entry 216 is programmed in any of the master switch forwarding units at 510. For example, the master multicast firmware 213 of FIG. 2 may search the master programming table 214 to determine if the first entry 216 has been programmed in any of the master switch forwarding units 220, 224. In particular, master the multicast firmware 213 may search entries of the master programming table 214 to determine if the first entry 216 has been programmed by searching the master programming table 214 for the multicast destination address and corresponding multicast membership information of the first entry 216 added to the global forwarding table at 504.

At 512, when the entry is not programmed in any of the master switch forwarding units, a determination is made as to whether the entry is programmed in any of the slave switch forwarding units at 514. For example, the master multicast firmware 213 of FIG. 2 may communicate with the slave multicast firmware of substantially all of the slave distributed switch elements and request a search of the corresponding slave programming tables for the first entry 216. The first slave multicast firmware 232 and the nth slave multicast firmware 248 may search entries of the first slave programming table 234 and the nth slave programming table 250, respectively, to determine if the first entry 216 has been programmed by searching the programming tables 234, 250 for the multicast destination address and corresponding multicast membership information of the first entry 216 added to the global forwarding table at 504.

In particular, the master multicast firmware 213 may communicate with the first slave multicast firmware 232 and solicit the entry's programming status from the first slave programming table 234. Similarly, the master multicast firmware 213 may communicate with the nth slave multicast firmware 248 and solicit the first entry 216's programming status from the nth slave programming table 250. The first slave multicast firmware 234 and the nth slave multicast firmware 248 may search the first programming table 234 and the nth programming table 250 to determine if the first entry 216 has been programmed in any of the first slave switch forwarding units 236, 240 and the nth switch forwarding units 252, 256, respectively.

The programming status of the entry is received at 516. For example, both the first slave multicast firmware 234 of FIG. 2 and the nth slave multicast firmware 248 may communicate the first entry 216's programming status to the master multicast firmware 213, and the programming status is received by the master multicast firmware 213.

At 518, when the programming status of the entry indicates that the entry is not programmed in any slave switch forwarding units, the entry may be indicated to be a cast-out candidate, as it has aged out, at 520. Indeed, the entry is not programmed in any master switch forwarding units or any slave switch forwarding units, and as such, the master multicast firmware 213 of FIG. 2 may communicate with the snooper 208 and indicate the first entry 216 to be a cast-out candidate. The snooper 208 may decide whether the first entry 216 should be removed from the global forwarding table 209, and may communicate the removal of the first entry 216 to the master multicast firmware 213 for synchronization of the global forwarding table 215. The timer of the entry may be restarted at 522. For example, the master multicast firmware 213 may restart the first timer 218, and control may proceed to 508 as described above.

Returning to 512, when the entry is programmed in any of the master switch forwarding units, the hit status may be checked at 524. As the hit status may be at the hardware cache level, the hit status may be set by hardware when a multicast packet is forwarded to that entry, and checked (e.g., the hit may be on if hit status=true or if a hit bit is set) and reset by the corresponding multicast firmware. When the hit is on, which is indicative of forwarding of a multicast packet, the hit status may be reset at 526, and the timer of the entry may be restarted at 522. For example, assuming the master programming table 214 indicates that the master switch forwarding unit 220 is programmed with the first entry 216, the master multicast firmware 213 may check the hit status of the first entry 216 in the multicast destination address cache 222. In particular, the master multicast firmware 213 may search entries of the multicast destination address cache 222 for the multicast destination address and corresponding multicast membership information of the first entry 216 added to the global forwarding table at 504 and check the hit status. The master multicast firmware 213 may reset the hit status (e.g., reset hit status to false or clear a hit bit) of the first entry 216 in the multicast destination address cache 222. Furthermore, the master multicast firmware 213 may restart the first timer 218, and control may proceed to 502 as described above.

Returning to 512, even if the master multicast firmware 213 finds that a hit is on because at least one of the master switch forwarding units 220, 224 has forwarded a multicast packet using the first entry 216, a hit on for any of the slave switch forwarding units may need to be reset (e.g., reset hit status to false or clear a hit bit) anytime the first timer 218 expires. As such, control may also proceed to 514, 516, 518, and 520 as described hereinabove. Moreover, when a cast-out candidate is indicated due to aging out and the first entry 216 is programmed in at least one switch forwarding unit, the snooper 208 may request the master multicast firmware 213 to invalidate or remove the entry from substantially all switch forwarding units that the entry is programmed in. The master multicast firmware 213 may remove the entry from the master switch forwarding units 220, 224 if any of these are programmed per the master programming table 214. The master multicast firmware 213 may also communicate with the first slave multicast firmware 232 and the nth slave multicast firmware 248 and have them remove the entry from the first slave switch forwarding units 236, 240 and the nth slave switch forwarding units 252, 256 if any of these are programmed per the first slave programming table 234 and the nth slave programming table 250, respectively.

Returning to 518, when the entry is programmed in any of the slave switch forwarding units, the hit status may be checked at 528. When the hit is on, which is indicative of forwarding of a multicast packet, the hit status may be reset at 526, and the timer of the entry may be restarted at 522. For example, assuming the first slave programming table 234 indicates that the first slave switch forwarding unit 236 is programmed with the first entry 216, the first slave multicast firmware 232 may check the hit status of the first entry 216 in the multicast destination address cache 238. In particular, the first slave multicast firmware 232 may search entries of the multicast destination address cache 238 for the multicast destination address and corresponding multicast membership information of the first entry 216 added to the global forwarding table at 504 and check the hit status. The first slave multicast firmware 232 may reset the hit status (e.g., reset hit status to false or clear a hit bit) in the multicast destination address cache 238. Furthermore, the first slave multicast firmware 232 may restart the first timer 218, and control may proceed to 502 as described above.

In summary, if an entry is not programmed in any master switch forwarding units, or if the entry is programmed but has a hit status equal to false, the master multicast firmware may communicate with the snooper to indicate the cast-out candidate that has aged out. If the entry is programmed in any master switch forwarding unit and has a hit status equal to true, the master multicast firmware may reset the hit status in the corresponding switch forwarding unit and may restart the entry's timer. Moreover, if the entry is not programmed in any of master switch forwarding unit, and at least one slave multicast firmware determines that the entry is programmed in a slave switch forwarding unit that it manages, the slave multicast firmware may reset the hit status. Furthermore, the slave switch element may return the hit status to the master multicast firmware and indicate that the entry is programmed and packet forwarding activity has occurred (e.g. not a cast-out candidate).

Those of ordinary skill in the art may appreciate that via the method 500, a global forwarding table may be managed even though there is no longer a one-to-one correspondence between the global forwarding table and the packet forwarding instructions programmed in the hardware. With traditional centralized switch, there typically existed a one-to-one correspondence because as the snooper learned about a new multicast group membership, it immediately programmed this information into its hardware (e.g., its only switch forwarding unit). Furthermore, the snooper also started a 'cast-out' timer for the entry. If the cast-out timer expired, the snooper typically solicited the hit status of the corresponding entry programmed in hardware. The hit status indicated if any packet forwarding activity occurred for the multicast destination address since the last time the timer expired (and the hit status was solicited). If the hit status was true, this indicated to the snooper that this entry was not a cast-out candidate, and the snooper restarted the entry's cast-out timer and reset the corresponding hardware entry's hit status. In the case where the hit status was false, the entry was generally deemed a cast-out candidate and the snooper removed it from its multicast table and invalidated the entry in hardware. As such, an additional entry might become available for a new multicast group membership to be learned.

However, correspondence in distributed switches may be a one-to-many correspondence, as a certain multicast destination address and the corresponding multicast membership information may be programmed in a multitude of switch forwarding units. Yet, as discussed in connection with FIG. 5, described herein is a methodology for the multicast firmware to utilize the hit statuses across the multitude of switch forwarding units and to work in concert with the snooper to determine multicast entries that are cast-out candidates. In particular, timers are utilized in the global forwarding table, and the multicast firmware, master and slaves, may find an entry's hit status set to 'true' or 'false'. If any switch forwarding units have a hit status set to 'true' when the timer expires, for example, the entry may be deemed to not be a cast-out candidate. In this case, the hit status for that entry may be set to false. The next time the timer expires, once again the hit status may be polled. If the hit status has remained false across the multitude of switch forwarding units, the entry may be deemed to be a cast-out candidate as it has aged out, and the master multicast firmware communicates this to the snooper. The snooper has the authority to remove an entry from its global forwarding table and subsequently request the master multicast firmware to remove the entry from its global forwarding table. Moreover, the multicast firmware, both master and slave, may be requested to invalidate or remove the corresponding entry anywhere it is programmed across the multitude of switch forwarding units.

Particular embodiments described herein may take the form of an entirely hardware embodiment, an entirely firmware environment, an entirely software embodiment, or an embodiment containing any combination of hardware, firmware, and software elements. In a particular embodiment, the disclosed methods are implemented in software that is embedded in processor recordable and readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or recordable computer-readable, non-transitory storage medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device) or a propagation medium. Examples of a recordable computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments.

Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A method comprising:
using a multicast router as a general querier and a distributed switch as a separate querier to obtain most current multicast membership information, wherein the distributed switch includes a plurality of distributed switch elements with a plurality of switch forwarding units, performing operations comprising:
sending a first query for multicast membership information by the multicast router based on an interval of time;
when a multicast destination address of a multicast packet is unregistered, generating a miss event in a switch forwarding unit of a distributed switch element of the distributed switch, the miss event indicating that there is a need for the multicast membership information;
sending, by the switch forwarding unit, a second query for the multicast membership information;
receiving a report of the multicast membership information from at least one host; and
updating the multicast membership information in the distributed switch based on the report.

2. The method of claim 1, wherein the first query and the second query are group specific queries soliciting at least one host that is a member of a group identified by the multicast destination address for the multicast membership information.

3. The method of claim 1, wherein the first query and the second query are general queries soliciting hosts attached to the distributed switch to provide all multicast membership information for multicast destination addresses.

4. The method of claim 1, wherein the second query is initiated by a master distributed switch element of the distributed switch.

5. The method of claim 1, wherein the second query is initiated by a slave distributed switch element of the distributed switch.

6. The method of claim 1, further comprising programming the switch forwarding unit with multicast membership information received in response to the second query.

7. The method of claim 6, further comprising forwarding the multicast packet to at least one host identified by a second multicast membership information received in response to the second query.

8. The method of claim 1, further comprising:
determining whether multicast membership information of the multicast destination address is in a global forwarding table; and
initiating the second query when multicast membership information is not in the global forwarding table.

9. An apparatus comprising:
a distributed switch, comprising:
a plurality of distributed switch elements with a plurality of switch forwarding units,
wherein a multicast router is configured to act as a general querier and the distributed switch is configured to act as a separate querier to obtain most current multicast membership information,
wherein the multicast router is configured to send a first query for multicast membership information based on an interval of time,
wherein, when a multicast destination address of a multicast packet is unregistered, a switch forwarding unit of a distributed switch element is configured to generate a miss event indicating that there is a need for the multicast membership information,
wherein the switch forwarding unit is configured to send a second query for the multicast membership information,
wherein the switch forwarding unit is configured to receive a report of the multicast membership information from at least one host, and
wherein the distributed switch is configured to update the multicast membership information based on the report.

10. The apparatus of claim 9, wherein the first query and the second query are group specific queries soliciting the at least one host, wherein the host that is a member of a group identified by the multicast destination address for the multicast membership information.

11. The apparatus of claim 9, wherein the first query and the second query are general queries soliciting all hosts attached to the distributed switch to provide all multicast membership information for all multicast destination addresses.

12. The apparatus of claim 9, wherein the second query is initiated by a master distributed switch element of the distributed switch.

13. The apparatus of claim 9, wherein the second query is initiated by a slave distributed switch element of the distributed switch.

14. The apparatus of claim 9, wherein the distributed switch is configured to program the switch forwarding unit with multicast membership information received in response to the second query.

15. The apparatus of claim 14, wherein the switch forwarding unit is configured to forward the multicast packet to at least one host identified by the multicast membership information received in response to the second query.

16. The apparatus of claim 9, wherein the distributed switch is configured to:
determine whether multicast membership information of the multicast destination address is in a global forwarding table; and
initiate the second query when multicast membership information is not in the global forwarding table.

17. A method of requesting multicast membership information of a group identified by a multicast destination address comprising:
using a multicast router as a general querier and a distributed switch as a separate querier to obtain most current multicast membership information;
sending a first query for the multicast membership information by the multicast router based on an interval of time;
initiating a second query for the multicast membership information of the multicast destination address in response to a miss event indicating that the multicast destination address is unregistered in a switch forwarding unit of a distributed switch element;
receiving the multicast membership information in response to the second query from at least one host;
snooping the multicast membership information received in response to the second query; and
programming the switch forwarding unit with the snooped multicast membership information.

* * * * *